Feb. 26, 1935. F. C. MATTHAEI 1,992,710
MANUFACTURE OF AUTOMOBILE FRAMES
Original Filed Aug. 11, 1933
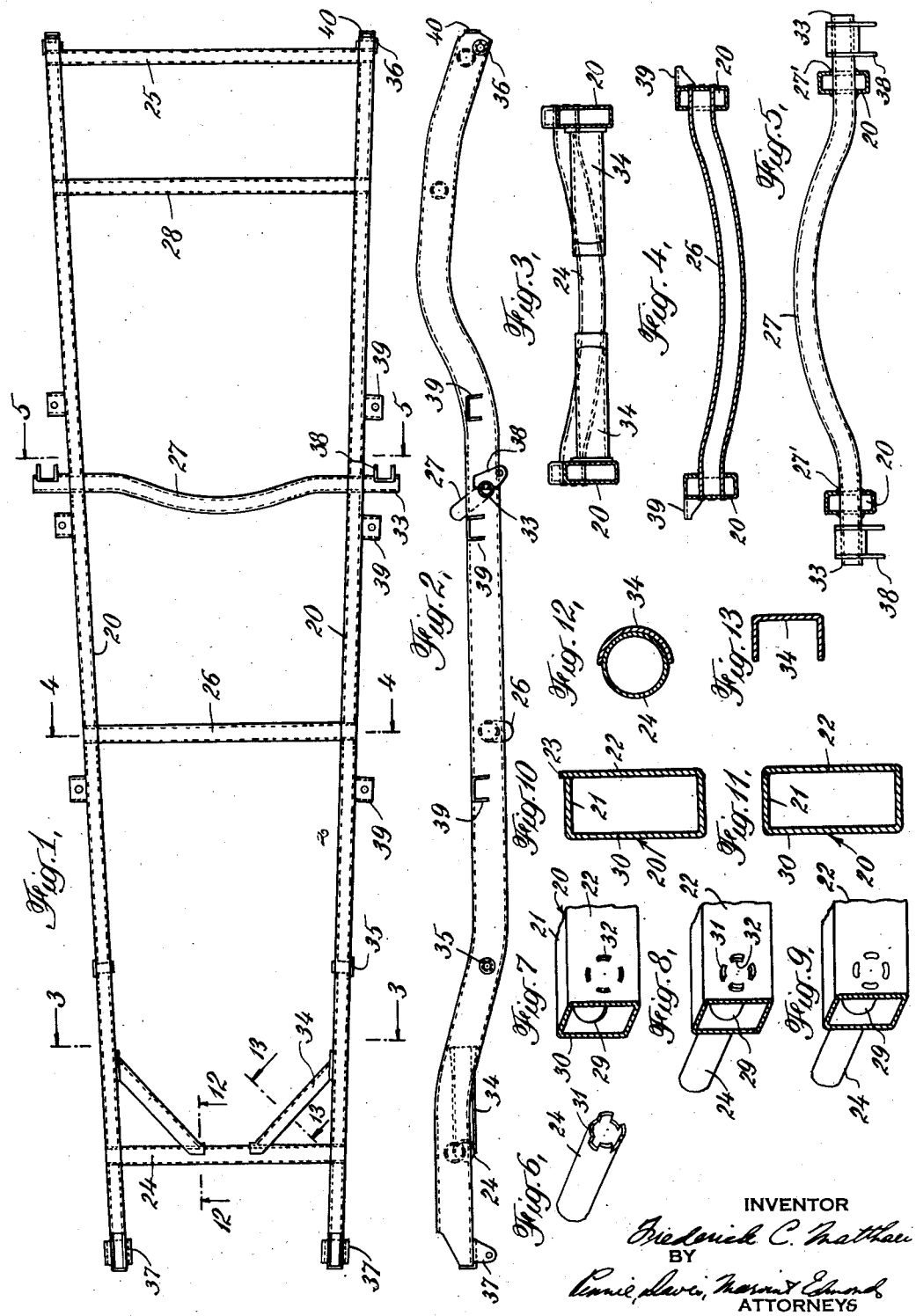
INVENTOR
Frederick C. Matthaei
BY
ATTORNEYS Patented Feb. 26, 1935

1,992,710

UNITED STATES PATENT OFFICE 1,992,710

MANUFACTURE OF AUTOMOBILE FRAMES

Frederick C. Matthaei, Detroit, Mich.

Original application August 11, 1933, Serial No. 684,614. Divided and this application February 3, 1934, Serial No. 709,603

11 Claims. (Cl. 29—152)

This invention relates to frames for automobiles and has particular reference to the manufacture of a chassis frame which combines in a superior degree the primary requisites of strength to withstand all of the forms of stresses and strains to which such frames are subjected, together with light weight and low manufacturing cost.

In the manufacture of frames for automobiles, it has been the common practice to fabricate the frame from pressed steel shapes, usually including side members of channel section bent to the proper contour and connected in rigid spaced relation by cross-pieces, struts or bars welded or riveted in place. In order to secure the requisite rigidity and strength, the frame manufactured in accordance with prevailing methods has been made of metal parts which are disproportionately heavy by comparison with the relatively light parts used throughout the remainder of the vehicle, and the shaping of these relatively heavy frame parts has required large, heavy and expensive machinery, and also the process of manufacture has involved the production of a considerable amount of waste metal with consequent increased expense.

In accordance with the present invention, an automobile chassis frame is provided which may be of lighter weight and still possess the necessary strength and rigidity and which is less expensive to manufacture by comparison with frames made in accordance with the procedure heretofore common. The new frame is of special value for use in association with an automobile body of such construction that it serves as a reinforcement or stiffener for the frame and thus permits of the use of a frame of lighter weight than would otherwise be permissible; bodies in which the so-called streamline effect is more pronounced lend themselves particularly to such construction.

The new method constituting the present invention involves the formation of two side members and a plurality of cross-members, each formed from sheet metal by rolling or forming it lengthwise to the shape of a hollow closed figure such as a rectangle or circle, the side members being curved lengthwise as is required in automobile construction and each of them being made from a single piece of sheet metal which, when formed longitudinally into the desired cross-sectional shape, has its edges brought together to form a single longitudinal seam whose edges are welded together throughout the length of the member.

More particularly, each of the side members of the new frame is made of a single metal strip which is pierced with various holes of appropriate size and appropriate location for subsequent use in assembling the parts of the frame and the frame attachments, and this metal strip is then rolled or formed longitudinally into a round, square, rectangular or other tubular section. Preferably the section is oblong with rounded corners, the seam is formed at one of the corners, and one edge of the metal piece projects slightly beyond the other, with the result that the welding operation fuses the metal of this projecting edge down into the seam and effects an autogenous weld between the edges of the strip.

Inasmuch as the lateral edges of the blank from which the tube is made are frequently uneven, a seam formed by one of these edges and the abutting flat surface of the blank in the manner described is more uniform in strength than an edge-to-edge seam in which the irregularities in the two edges may be cumulative with the result that a seam of non-uniform strength is formed. Also, the location of the seam at a corner of the polygonal cross-section of the side-member reduces strains in the seam during the operation of bending the member into proper shape, so that the seam is not placed under permanent strains which would tend to promote opening of the seam or rupture of the side-members at the seam under severe operating conditions.

The development of the desired lengthwise curvatures in such a chassis frame side-member formed thus from a single sheet metal strip and welded along the seam, presents a problem because it is essential that the uniform tubular cross-section of the frame member be preserved notwithstanding the stresses of the bending operation. One procedure whereby this may be accomplished involves the use of an articulated mandrel which is located within the member during the operation of subjecting it to pressure to bend it to the desired curvature and which is specially constructed to permit of collapsing it to an extent sufficient to permit its withdrawal when the bending operation is completed. This longitudinal bending to which I refer usually includes long radius arches over the front and rear axles of the car in which the frame is used.

As thus formed, the side-members possess great strength in proportion to the amount of metal used in them, this being due particularly to the tubular cross-section into which the sheet metal piece of the member is developed and the fact that there is but a single lengthwise seam in the members which may be welded rapidly and at low cost to produce a wall of as great strength at the weld as elsewhere.

The cross-members of the frame are preferably in the form of tubes made by bending appropriate sheet metal blanks to a circular cross-section and welding the resultant longitudinal seams.

The procedure incident to securing the ends of these cross-members to the side-members is of great importance because strong joints at these points are so essential to the requisite strength and rigidity of the frame. These requisites are attained by providing openings in the inner and outer side walls of the side-members, inserting the ends of the cross-member through these holes, and fastening the cross-member rigidly to the inner and outer side walls of the side-members. For this purpose the inner and outer side walls of the side-member may have round holes cut therethrough of a size corresponding closely to the exterior diameter of the tubular cross-member, and the end of the cross-member may be inserted through these holes and secured by an electric welding operation to both side walls of the side member. While this procedure is the procedure which I prefer, another which may be employed involves the provision of a circular opening through the inner side wall of the side-member corresponding to the outer diameter of the cross-member and a circular series of openings in the outer side wall, and also a corresponding series of projections upon the extreme end of the cross-member; the end of the cross member is passed through the opening in the inner wall of the side-member, and the projections on the end of the cross-member are inserted through the corresponding openings in the outer wall of the side-member, whereupon the cross-member is secured to both walls of the side-member by welding operations which include fusing or otherwise upsetting the metal of the protruding projections upon the outer face of the side-member.

As above indicated, each side-member and each cross-member of the frame is made from a steel strip of the appropriate length and width. The strip for a side-member while still flat is pierced with certain of the openings therethrough required in the finished member, all of the size, shape and location required. However, those openings to be located in the portion of the side-member which is to be subjected to lengthwise bending are not pierced at this time because they would be distorted in shape or their edges roughened in that bending operation. However, if desired, all holes may be formed after formation of side-members is completed. Then the strip or pierced blank is formed into a tube with the single seam welded longitudinally, and this tube is subjected to the lengthwise bending as above set forth to provide for arches over the front and rear axles. Then the remaining openings in the side walls of the side-member are formed by piercing or drilling, the side and cross-members are assembled and fastened to form the frame, and the several attachments of the frame are secured in place.

By this procedure a frame of great rigidity is produced, well adapted to withstand the strains to which it is subjected, and at the same time the desirable attributes of light weight and low cost are also attained.

For a more complete understanding of my invention, reference may be had to the accompanying drawing in which Figure 1 is a plan view of the completed frame embodying the invention; Figure 2 is a side view thereof; Figures 3, 4 and 5 are cross-sections on lines 3—3, 4—4 and 5—5 of Figure 1; Figure 6 is a view of the end of one of the cross-members; Figures 7, 8 and 9 are detail views illustrating one procedure which may be employed in uniting a cross-member to a side-member; Figures 10 and 11 are cross-sectional views of a side-member illustrating the preferred procedure in forming them; Figures 12 and 13 are detail cross-sectional views on lines 12—12 and 13—13 of Figure 1.

Referring to the drawing, Figures 1 and 2 illustrate the general characteristics of the completed frame. The side-members 20 are preferably straight in plan but may be bent more or less out of a straight line as may be required by the design of the automobile on which the frame is to be used.

In elevation, these side-members 20 are bent out of a straight line as is indicated in Figure 2, and the details of the shape in this respect are determined by the design of the car. The bending usually includes an arch formation for clearing the rear axle, and also more or less of an arch at the forward end to extend over the front axle.

These side-members 20 are of round, square, oblong or other tubular section, and each is formed from a single pierced strip of sheet metal which is subjected to a rolling or pressing operation to bend it along longitudinal lines into the cross-sectional shape desired, such as that indicated in Figure 10. Thus, a single seam is provided running lengthwise of each side-member 20, and this seam is preferably formed along the line of abutting contact of the edge of the top wall 21 with the inner surface of the outer side wall 22, the edge 23 of which projects slightly above the upper surface of the top wall 21, as is indicated in Figure 10. These two abutting edges of the seam are then united by welding, preferably by electric welding, and in the process of welding the surplus metal of the projecting edge 23 is fused into the seam to seal it, as is indicated in Figure 11, which shows the side-member after the weld has been made.

In assembling the side members into the frame they may be arranged with the seams along their upper edges or with the seams along one of their lower edges, depending upon requirements, the bending of the side-members being done with the seams in either of these positions.

The bending of each side-member lengthwise, as for instance to give it the formation illustrated in Figure 2, must be effected under conditions which guard adequately against collapse or distortion of the tubular section. This may be accomplished by the employment within the side-member of a collapsible, articulated mandrel whose articulated construction permits it to bend as required while performing its function of sustaining the walls of the side-member against collapse, and which may be partially collapsed thereafter to permit of withdrawing it from the interior of the side-member.

The side members are preferably bent in the direction indicated, that is, in a plane substantially parallel to the side walls 22 and 30, so that the strain imposed on the seam by the bending operation is minimized and permanent strains therein avoided which would tend to promote opening of the seam or rupture of the side-members at the seam under severe operating conditions.

The two side-members 20 formed in this manner are rigidly connected together in properly spaced relation by a series of spaced cross-members including front cross-member 24, rear cross-member 25, and one or more intermediate cross-members such as are indicated at 26, 27 and 28. These cross-members are formed of blanks of sheet metal rolled into tubular section, and the resulting longitudinal seam is welded. They may be bowed forwardly and upwardly as in the case of member 27, or downwardly as in the case of member 26, depending upon structural requirements of the automobile.

One procedure which may be used in making joints of the requisite strength between the cross-members and the side-members is illustrated in detail in Figures 6, 7, 8 and 9. This joint is formed by inserting the ends of the cross-member through circular holes 29 formed in the inner side walls 30 of the side-members 20 (Fig. 7) and securing the extreme ends of the cross-member to the corresponding outer side walls of the side-members 20. The holes 29 are approximately the same diameter as the outer diameter of the cross-members so that the latter will fit closely therein.

The ends of the cross-members 24, 25, 26 and 28 are serrated to provide spaced projections 31, the axial length of which is slightly greater than the thickness of the outer side wall 22. Corresponding slots 32 are punched or otherwise formed in circular series in the outer side wall 22 of the side-member 20 in alignment with the corresponding hole 29 in the inner side wall.

With the end of the cross member passed through the hole 29 in the inner side wall, the projections 31 are inserted in the corresponding slots in the outer side wall with their ends protruding beyond the outer surface of the wall, as is illustrated in Figure 8. These protruding ends are then anchored in place, preferably by being fused with an electric arc to melt them down into welding contact with the outer wall 22 of the side-member 20, as illustrated in Figure 9. The cross-member is also secured to the inner walls 30 of the side-members, preferably by electric welding.

Another procedure which may be employed in securing the ends of the cross-members to the side-members and which I have found to be preferable in most instances, is to extend each end of a cross-member through openings in both side walls of each side-member corresponding in shape exactly to the cross-sectional shape of the cross-member so that the end of the cross-member makes a driving fit therein. The cross member may be and preferably is secured to both side walls of the side member by welding, as is indicated at 27' in Figure 5. In this way joints of great strength are secured. If desired, the ends of the cross-members may be extended beyond the outer walls of the side-members and may be used for the support or attachment of parts of the automobile structure; for instance, channel-shaped rear spring brackets 38 are shown as secured to the protruding ends of the cross-member 26.

The front cross-member 24 may also be connected by diagonal braces 34 (Figs. 1 and 2) to the inner walls 30 of side-members 20, the inner ends of these braces 34 being shaped to conform to the curvature of the front cross-member 24 as is illustrated in Figure 12, while the outer ends are made flat to conform to the flat surfaces presented by the side-members 20. The braces 34 are channel shape in cross-section as is illustrated in Figure 13, and their ends are welded to the cross-members 24 and to the side-members 20.

Other parts illustrated in the drawing include spring-hanger bushings 35 and 36, front spring-brackets 37, body brackets 39, and rear bumper plates 40. Suitable openings for use in mounting certain of these parts in position may be formed in the sheet metal strips from which the side-members are made coincident with forming certain of the openings for the ends of the cross-members and prior to bending the strip to its tubular form. However, as above pointed out, all of the openings required in the walls of the side-members cannot ordinarily be pierced in the strips from which the members are formed prior to bending the strips to their tubular form; the openings occurring in the portions of the side-members which are bent longitudinally are provided therein, subsequent to the bending operation, either by piercing or by drilling.

In the foregoing I have described the method which constitutes my invention and indicated the procedure which I consider to be the best in practicing the invention, but it is to be understood, and in fact I have indicated, that the method constituting the invention may be practiced in alternative and equivalent ways. Therefore, I do not wish to be considered as limited to the particular procedure I have described herein as I consider such alternative and equivalent procedures to be within the scope of my invention and I aim to cover them by the terms employed in the claims appended hereto.

This application is a division of my application for patent on Automobile chassis frame, filed August 11, 1933, and serially numbered 684,614.

I claim:

1. The method of making an automobile chassis frame which comprises bending two elongated sheet metal strips on longitudinal lines to form tubes each having a single longitudinal seam, welding each tube along the seam therein to form a tubular side-member for the frame, bending each side-member longitudinally while maintaining its tubular structure, and securing the two side-members together in spaced relation by cross-members whose end portions are secured to the side-members.

2. The method of making an automobile chassis frame which comprises bending two elongated sheet metal strips on longitudinal lines to form tubes, each having parallel side walls and a single longitudinal seam, welding each tube along the seam therein to form a tubular side-member for the frame, bending each side-member longitudinally while maintaining its tubular structure, providing aligned openings in opposite side walls of each side-member at a plurality of points therein, and securing the two side-members together in spaced relation by cross-members each having each end extending through a pair of aligned openings in the side walls of a side-member and secured to both of said side-walls.

3. The method of making an automobile chassis frame which comprises bending two elongated sheet metal strips on longitudinal lines to form tubes of rectangular cross-section each having a single longitudinal seam adjacent to one of the corners of the rectangle, welding each tube along the seam therein to form a tubular side-member for the frame, bending each side-member longitudinally while maintaining its tubular structure, and securing the two side-members together in parallel relation by cross-members whose end portions are secured to the side-members.

4. The method of making an automobile chassis frame which comprises bending two elongated sheet metal strips on longitudinal lines to form tubes of rectangular cross-section, each having a single longitudinal seam adjacent to one of the corners of the rectangle, and each having one side extended beyond the seam to supply surplus metal for welding, welding each tube along the seam therein by melting down said extension and thereby forming a rectangular tubular side-member for the frame, bending each side-member longitudinally while maintaining its tubular structure, and securing the two side-members together in spaced relation by cross-members whose end portions are secured to the side-members.

5. The method of making an automobile chassis frame which comprises bending two elongated sheet metal strips on longitudinal lines to form tubes, each having a single longitudinal seam, welding each tube along the seam therein to form a tubular side-member for the frame, and securing the two side-members together in spaced relation by cross-members whose end portions are secured to the side-members.

6. The method of making an automobile chassis frame which comprises bending two elongated sheet metal strips on longitudinal lines to form tubes, each having parallel side walls and a single longitudinal seam, welding each tube along the seam therein to form a tubular side-member for the frame, forming aligned openings in opposite side walls of each side-member at a plurality of points therein, and securing the two side-members together in spaced relation by cross-members, each having each end extending through a pair of aligned openings in the side walls of a side-member and secured to both of said side walls.

7. The method of making an automobile chassis frame which comprises bending two elongated sheet metal strips on longitudinal lines to form tubes of rectangular cross-section, each having a single longitudinal seam adjacent to one of the corners of the rectangle and each having one wall of the rectangle extending beyond the seam to supply surplus metal for welding, welding each tube along the seam therein to form a tubular side-member for the frame by melting down the metal of said extension, and securing the two side-members together in spaced relation by cross-members whose end portions are secured to the side-members.

8. The method of making an automobile chassis frame which comprises bending two elongated sheet metal strips on longitudinal lines to form tubes, each of which is of rectangular cross-section and has a single lengthwise seam therein adjacent to one corner of the rectangle, welding each tube along the single lengthwise seam therein to form a tubular side-member for the frame, forming aligned openings in opposite side walls of each side-member at a plurality of points therein and securing the two side-members together in spaced relation by tubular cross-members, each having each end extending through a pair of aligned openings in the side walls of a side-member and secured to both of said side walls by being welded thereto.

9. The method of making an automobile chassis frame which comprises bending two elongated sheet metal strips on longitudinal lines to form tubes, each of which is of rectangular cross-section and has a single longitudinal seam therein located at one corner of the rectangle and each tube having one side wall thereof extended beyond said seam to supply surplus metal for welding, welding each tube along the seam therein to form a tubular side-member for the frame by melting the metal of said extension and causing it to flow into the seam, bending each side-member longitudinally while maintaining its tubular structure, providing aligned openings in opposite side-walls of each side-member at a plurality of points therein, and securing the two side-members together in spaced relation by cross-members, each having each end extending through a pair of aligned openings in the side-walls of a side-member, and secured to both of said side walls by being welded thereto.

10. The method of making an automobile chassis frame which comprises forming two sheet metal side-members which are of rectangular tubular form over certain portions of their length, forming aligned openings in the side walls of said rectangular tubular portions of the side members and securing the two side-members together in spaced relation by a tubular metallic cross-member having each of its ends extending through a pair of aligned openings in the side walls of a side member and secured to both of said side walls by being welded thereto.

11. The method of making an automobile chassis frame which comprises bending two elongated sheet metal strips on longitudinal lines to form tubes, each having a single longitudinal seam, welding each tube along the seam therein to form a tubular side-member for the frame, and securing the two side-members together in spaced relation by cross-members, one of said cross-members having each of its ends extending through an opening in the inner side wall of a side-member and secured to both side walls of that side-member.

FREDERICK C. MATTHAEI.